July 5, 1966    E. A. J. MARCATILI    3,259,015
MULTIPLE REFLECTION OPTICAL WAVE MODULATOR
Filed April 30, 1962    3 Sheets-Sheet 1

INVENTOR
E. A. J. MARCATILI
BY
ATTORNEY

July 5, 1966  E. A. J. MARCATILI  3,259,015
MULTIPLE REFLECTION OPTICAL WAVE MODULATOR
Filed April 30, 1962  3 Sheets-Sheet 2
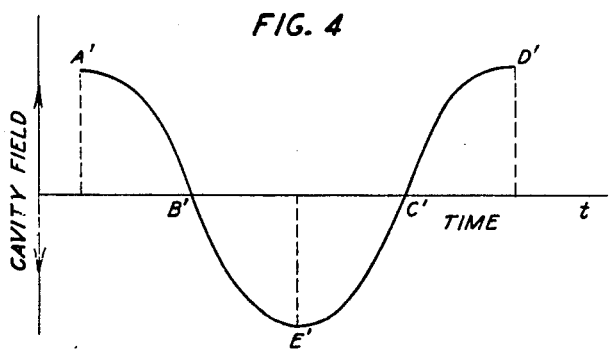
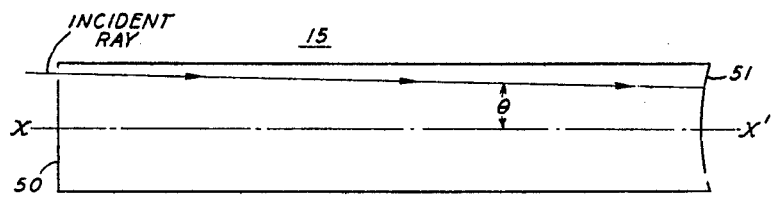
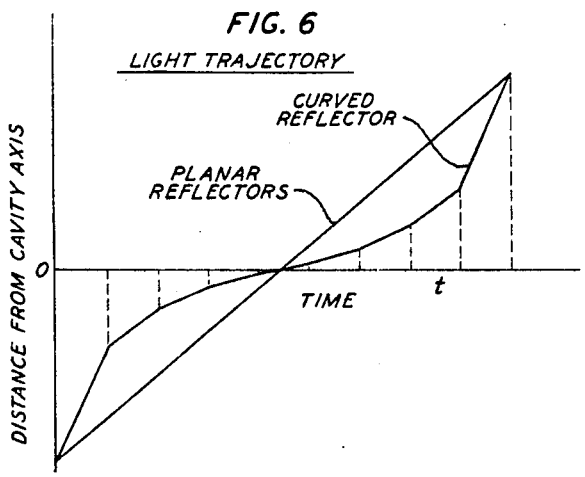
INVENTOR
E. A. J. MARCATILI
BY
ATTORNEY

United States Patent Office 3,259,015
Patented July 5, 1966

3,259,015
MULTIPLE REFLECTION OPTICAL WAVE MODULATOR
Enrique A. J. Marcatili, Fair Haven, N.J., assignor to Bell Telephone Laboratories, Incorporated, New York, N.Y., a corporation of New York
Filed Apr. 30, 1962, Ser. No. 190,882
14 Claims. (Cl. 88—61)

This invention relates to signal modulators and, in particular, to means for amplitude modulating electromagnetic wave energy in the infrared, visible and ultraviolet portion of the frequency spectrum.

Means for generating electromagnetic waves in the infrared, visible and ultraviolet frequency ranges, hereinafter to be referred to collectively as the optical range, have been disclosed in United States Patent 2,929,922 issued to A. L. Schawlow et al. and in the copending United States application of A. Javan, Serial No. 816,276, filed May 26, 1959, assigned to applicant's assignee. The Javan application has since been abandoned in favor of a continuation-in-part application, Serial No. 277,651, filed May 2, 1963, which application is also assigned to applicant's assignee. Wave energy generated in the manner explained by Schawlow et al. and by Javan is characterized by a high degree of monochromaticity and coherency. In addition, because of the very high frequency of wave energy in the optical portion of the frequency spectrum, such wave energy is capable of carrying enormous amounts of information and is, therefore, particularly useful as a transmission medium in a communication system. However, efficient utilization of this great potential is dependent upon the availability of means for modulating wave energy at these very high frequencies.

It is, accordingly, the broad object of this invention to amplitude modulate electromagnetic waves in the optical portion of the frequency spectrum.

In United States Patent 2,616,926, issued November 4, 1952 to H. Jaffe, there is described a light modulator utilizing the Pöckels electro-optical effect. Devices of the type described by Jaffe are limited in their use to low modulating frequencies since the large modulating voltages required are not readily available at the higher modulating frequencies contemplated by the invention.

One method of overcoming the practical limitations inherent in the Jaffe patent is disclosed in an article by J. P. Kaminow entitled "Microwave Modulation of the Electro-Optical Effect in $KH_2PO_4$" (Physical Review Letters, vol. 6, No. 10, May 15, 1961, pages 528 to 529), wherein there is described a traveling wave light modulator which also utilizes the Pöckels electro-optical effect. To produce the desired traveling wave interaction and, thereby, produce light modulation, it is necessary that the modulating radio frequency wave propagates with the same phase velocity as the light in some suitably proportioned structure over a substantial distance.

It has been found, however, that most electro-optically active substances have considerable loss at the desired modulating frequencies and when traveling wave interaction is employed, the modulating wave is rapidly attenuated and a limit to the useful length of the interaction region is thereby set. As a consequence, the modulation is inefficient. An attempt to overcome this deficiency is described in United States Patent 3,133,198, wherein the modulating power is continuously fed into the modulator from an auxiliary guide. In spite of such improvements, traveling wave modulators of this general type require long lengths of electro-optical material, relatively large amounts of modulating power and a high degree of synchronization between the phase velocity of the modulating wave and the light wave.

It is, accordingly, a more specific object of the instant invention to reduce the volume of electro-optical material used in an optical modulator.

It is another object of the invention to reduce the modulating power needed in an optical modulator.

It is still another object of the present invention to simplify the structure of an optical modulator.

These and other objects of the present invention are achieved by establishing the modulating field in a resonator filled with a suitable electro-optical material. The length of the resonator in the direction of the optical path is related to the velocity of propagation of the optical wave and the modulating frequency. So proportioned, the optical wave traverses the material in synchronization with the changes in the modulating field producing a cumulative electro-optical effect. To enhance the interaction between the optical wave and the electro-optical material, the resonator ends are made highly reflective for the optical wave causing it to be reflected at the ends and, hence, to traverse the electro-optical material a number of times. The effect produced is similar to having the optical wave traverse an equivalent length of material equal to the product of its physical length and one plus the number of reflections in the resonator.

The input optical wave, linearly polarized in a given direction, is introduced into the resonator through a first transparent aperture at a slight angle to the resonator axis. As the wave traverses the resonator a number of times, it progresses transversely across the resonator and is extracted through a second transparent aperture in the resonator wall. In the presence of the modulating signal the linearly polarized input wave is converted to an elliptically polarized wave having a component perpendicular to the direction of polarization of the input wave. The output wave is then passed through an analyzer whose direction of polarization is perpendicular to that of the input wave. Thus, in the absence of a modulating wave, none of the incident wave energy is propagated past the analyzer. In the presence of the modulating wave, however, a portion of the incident wave is propagated therethrough.

In one embodiment of the invention, the reflective resonator ends are parallel, planar members. In a second embodiment, more efficient use is made of the electro-optical material by making one or both of the resonator ends convex.

These and other objects and advantages, the nature of the present invention, and its various features, will appear more fully upon consideration of the various illustrative embodiments now to be described in detail in connection with the accompanying drawings, in which:

FIG. 1 is an illustrative embodiment of a modulator in accordance with the invention;

FIG. 2, given for the purposes of explanation, shows the manner in which an optical ray traverses the modulator;

FIG. 3, given for the purposes of explanation, shows the modulating field distribution within the modulator;

FIG. 4, given for the purposes of explanation, shows the variation of the modulating field with time;

FIG. 5 shows a resonator having a convex end wall;

FIG. 6 shows the distance between a point in a wavefront and the resonator axis as a function of time for a resonator having parallel, planar reflectors and for a resonator having at least one curved reflector.

Figure 1:
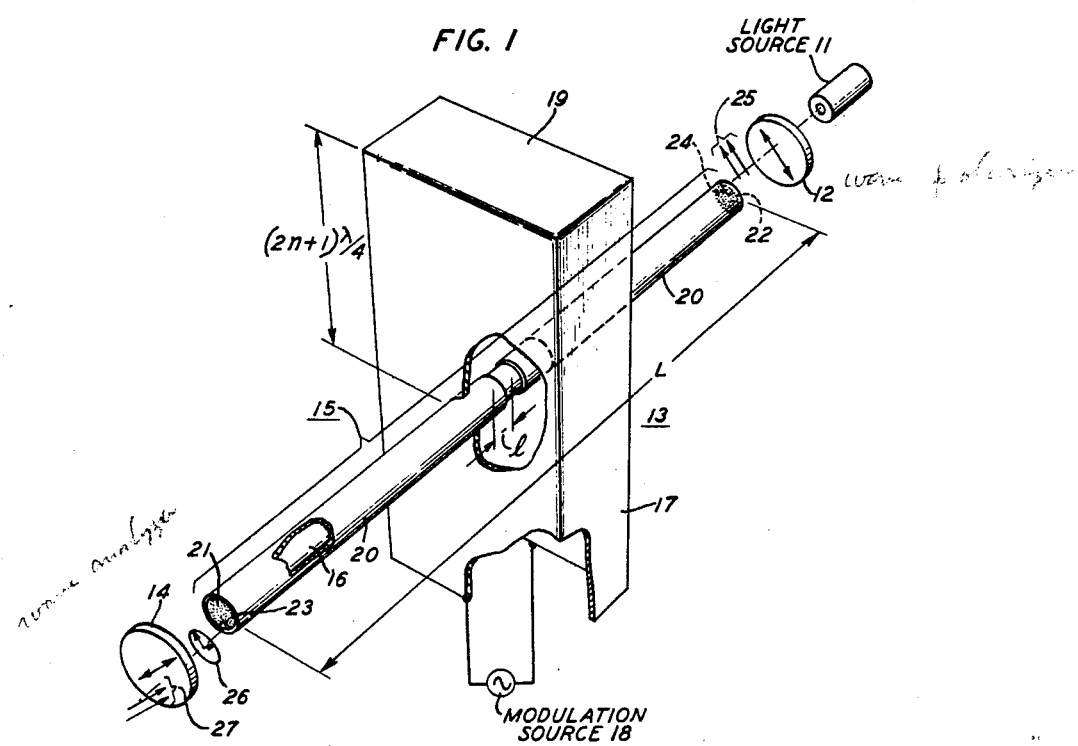

Turning now to FIG. 1, there is illustrated a modulator embodying the principles of the present invention. The modulator comprises, in cascade, a wave polarizer 12, a differential phase shifter 13 and a wave analyzer 14.

The optical wave to be modulated is derived from any convenient source, shown as source 11. Preferably, an optical maser operating in the visible portion of the frequency spectrum is used as the source. The wave polarizer 12 and the wave analyzer 14 are of any type well known in the art such as, for example, piles of plates or Nicol prisms. (See "Fundamentals of Optics" by F. A. Jenkins and H. E. White, pages 492 and 500.) The differential phase shifter 13 comprises a cylindrical microwave resonator 15, comprising a conductive cylinder 20 in which there is located a rod of electro-optical material 16, and means for exciting resonator 15 including a source of microwave energy 18 such as, for example, is described in United States Patent 2,891,191, issued to H. Heffner and R. Kompfner on June 16, 1959, and a shorted section of rectangular waveguide 17.

Under the influence of the microwave modulating field established in the microwave resonator, a wave component is induced at right angles to the direction of polarization of the input light wave by the action of the electro-optical material. By orienting the light analyzer 14 so that it transmits light polarized in a direction perpendicular to the direction of polarization of the light passing through the polarizer 12, light transmission occurs only in the presence of a modulating signal and in an amount which varies as a function of the intensity of the modulating signal and the number of times the light wave traverses the electro-optical material.

Referring more specifically to FIG. 1, the differential phase shifter 13 comprises a microwave resonator 15 and a section of waveguide 17 which, for purposes of illustration, is a section of rectangular waveguide proportioned to support wave energy at the modulating frequency in the dominant $TE_{10}$ mode. One end of waveguide 17 is short-circuited by means of a conductive member 19 which extends transversely across the guide in a direction perpendicular to the guide axis. At the other end of guide 17 is the source 18 of wave energy at the modulating frequency.

The microwave resonator 15 is located at approximately an odd number of one-quarter guided wavelengths from the short circuit 19. As shown, the resonator passes through the center of the wide walls of guide 17 in a direction perpendicular thereto and extends symmetrically beyond the guide on both sides.

The term "electro-optical material," as used herein refers to those uniaxial materials which, under the influence of an electric field applied parallel to their optical axis, become optically biaxial. Normally, an optical wave propagating approximately parallel to the optical axis does so at substantially the same velocity regardless of the direction of polarization of the wave. However, in the presence of an electric field and as a result of the displacement of the optical axis of the material (more particularly, as a result of the conversion of the uniaxial material to an optical biaxial material) the propagation velocity of an optical wave traveling substantially parallel to the original optical axis is no longer independent of the direction of polarization of that wave. Instead, there are two mutually perpendicular principal directions of polarization, which exhibit substantially different propagation velocities. One of these directions is perpendicular to the plane defined by the two axes of the material when it is in its biaxial state. The other direction is parallel to that plane. For purposes of identification, these two directions will be referred to hereinafter as the "fast" and the "slow" directions. A wave applied at an angle to these two principal directions can be considered as made up of two mutually perpendicular components, one of which lies along the fast direction, and the other of which lies along the slow direction. After traversing the electro-optical material, the two component waves are shifted in phase with respect to each other. When recombined, upon emerging from the electro-optical material, an elliptically polarized wave is obtained. Which of the two principal directions is the "fast direction" or the "slow direction" depends upon the direction of the electric field. Thus, if after traversing a portion of the electro-optical material, the electric field is reversed, the designations are also reversed. In either event, however, the resulting elliptically polarized wave produced has one of its axes parallel to the direction of polarization of the incident wave and the other axis perpendicular thereto. The length of the other axis of the elliptically polarized wave varies as a function of the relative phase delay between the two wave components and is a measure of the amplitude of the output light since this axis is in a direction parallel to the direction of polarization passed by the analyzer 14.

For any particular orientation of the incident wave with respect to the principal directions, maximum output is obtained when the relative net phase delay produced by the electro-optical material is 180 degrees. In addition, for any particular relative phase delay the light output varies as a function of the orientation of the incident wave and is a maximum when it is oriented at 45 degrees with respect to the two principal directions. Accordingly, the plane of polarization of the incident wave is preferably oriented at 45 degrees to the principal directions and the maximum relative phase shift produced by the electro-optical material for some predetermined maximum amplitude of modulating signal is made to be 180 degrees.

When the two conditions are satisfied, the output wave is again linearly polarized but the direction of polarization is rotated 90 degrees with respect to the direction of polarization of the input wave. In addition, the intensity of the output wave is substantially the same as that of the input wave. Thus, when these two conditions are satisfied, the output wave has substantially the same intensity as the input wave; both are linearly polarized; and the direction of polarization is rotated 90 degrees with respect to the direction of polarization of the input wave.

For a detailed mathematical analysis of electro-optical effects, see "Optical Properties and Electro-Optic and Photo Elastic Effects in Crystals Expressed in Tensor Form" by W. P. Mason, published in the Bell System Technical Journal, volume 29, pages 161 to 188, April 1950. Also see the Journal of the Optical Society of America, volume 39, No. 10, October 1949, "The Electro-Optical Effect in Uniaxial Crystals of the Type $XH_2PO_4$," by B. H. Billings, part I, pages 797 to 801, part II, pages 802 to 808.

While there are many materials which exhibit electro-optical effects, the two tetragonal crystals, ammonium dihydrogen phosphate (ADP) and potassium dihydrogen phosphate (KDP) are particularly useful in that they exhibit a very large electro-optical effect. Accordingly, and for purposes of illustration, a rod of KDP material whose optical axis is aligned parallel to the rod axis is utilized in the embodiment of FIG. 1.

The ends 21 and 22 of cylinder 20 are made highly reflective for the optical wave except for the small apertures 24 in end 22 and 23 in end 21 which are transparent and through which the light beam enters and leaves the resonator 15. The ends 21 and 22 are simultaneously made to appear as short circuits with respect to the modulating frequency. Both these conditions can be satisfied by silvering the ends of rod 16.

Microwave energy is coupled from waveguide 17 to resonator 15 by means of a small gap in the conductive boundary of the reasonator. In the embodiment of FIG. 1 the gap, of length $l$, is located at the center of resonator 15. The gap exposes a small portion of the rod 16 to the electric field within guide 17 and thereby permits coupling of electromagnetic energy between the guide and the resonator. The over-all length L and the diameter of resonator 15 will be considered in greater detail hereinbelow.

Figure 2:
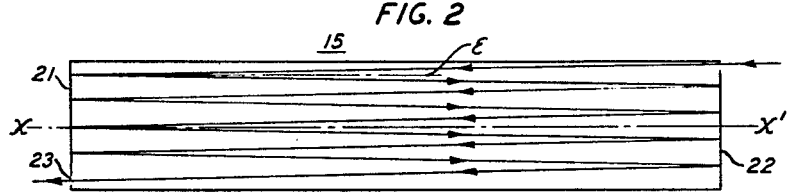

In operation, light, derived from the light source 11, is passed through the light polarizer 12 and emerges therefrom polarized in a direction parallel to that of the polarizer as indicated by the arrows 25. The polarized light enters the resonator 15 through aperture 24 at a slight angle to the resonator axis. The light beam traverses the resonator a number of times, being reflected back and forth from the mirrored ends 21 and 22. Because the incident beam enters the resonator at a slight angle with respect to the resonator axis, the multiply-reflected beam is displaced transversely until it reaches aperture 23 through which it emerges from the resonator. This is illustrated in FIG. 2 in which the incident beam enters resonator 15 through aperture 24 at a small angle $\epsilon$ with respect to the resonator axis $x$–$x'$, is reflected four times from each of the resonator ends 21 and 22, and emerges from the resonator through aperture 23. It is apparent that the number of reflections will vary depending upon the diameter of the resonator and the angle of incidence $\epsilon$.

Referring again to FIG. 1, the light beam, upon emerging from the differential phase shifter is caused to pass through a light analyzer 14. In the illustrative embodiment the light analyzer is rotated 90 degrees with respect to the light polarizer. Thus, in the absence of any modulating signal, the light applied to the analyzer would be polarized in the same direction as the incident light and there would be no transmission through the analyzer. In the presence of a modulating signal, however, a component of light perpendicular to the direction of polarization of the incident light is produced. Thus, the light applied to analyzer 14 will, in general, be elliptically polarized as indicated by the ellipse 26, and there will be some transmission through the analyzer as indicated by the arrows 27. As indicated above, maximum transmission occurs when the light wave emerging from resonator 15 is linearly polarized in the direction of the analyzer 14. Hence, the system is designed so that in the presence of a modulating field of a predetermined amplitude, the light traverses the modulator a sufficient number of times to produce the desired 180 degree differential phase shift necessary to produce a linearly polarized wave whose direction of polarization is perpendicular to the input wave.

As stated hereinabove, it is an object of the invention to reduce the amount of electro-optical material needed in a modulator by causing the light beam to traverse the electro-optical material a number of times. However, to insure that the electro-optical effects produced are cumulative, the light beam must propagate through the resonator in synchronism with the changes in the modulating field induced in the resonator.

Figure 3:
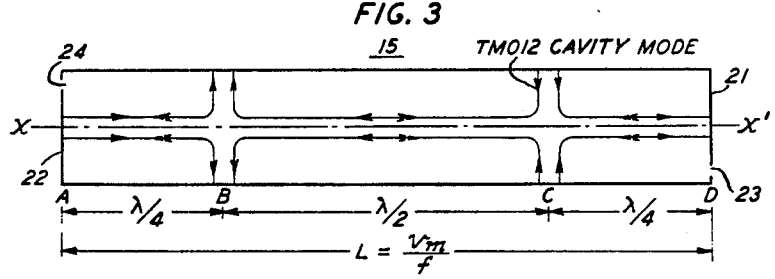

In the illustrative embodiment of FIG. 1 a $TM_{012}$ mode at the modulating frequency is induced in resonator 15. The electric field configuration for this mode is illustrated in FIG. 3 which is a longitudinal cross-sectional view of resonator 15. If the resonator length L is made equal to the velocity of propagation of the light through the electro-optical medium, divided by the modulating frequency, the light will travel through the resonator in the desired synchronism. For example, let us consider a light wavefront at a point A in resonator 15 at the instant the modulating field is at a maximum positive amplitude. For purposes of illustration, a positive amplitude corresponds to the field directions indicated in FIG. 3 by the solid arrowheads. This also corresponds to time A' on the curve of FIG. 4 which indicates graphically the amplitude and direction of the resonator field as a function of time. As the light wavefront propagates from point A to point B, the direction of the modulating field remains as indicated by the solid arrowheads. However, as indicated in FIG. 4, the amplitude of the field between time A' and B' is decreasing. Because of the manner in which the length L of resonator 15 was selected, by the time the light wavefront has reached point B a quarter wavelength away, one-quarter period at the modulating frequency has elapsed and the field within the resonator has reached zero amplitude at time B' as indicated in FIG. 4. As the wavefront continues to propagate within the resonator between points B and C, the direction of the modulating field is reversed, as indicated by the broken arrowheads, and insofar as the light wave is concerned, the direction of the modulating field is still from left to right. At point C at time C' the field again reduces to zero and then reverses as the wavefront continues to propagate from point C to D between time C' and D'. During this latter interval the modulating field is again directed as indicated by the solid arrowheads. As a result, this particular wavefront is always under the influence of electro-optical material that is unidirectionally biased by the modulating field. The resulting differential phase shift is always in the same direction and, for this particular wavefront, maximum output is produced.

For a wavefront starting at point A at any other time in the resonator field cycle, the wavefront experiences intervals when the modulating field reverses itself (thus reducing the net differential phase shift) and the net output from the modulator is less. In the particular case where a wavefront starts at point A in the resonator when the modulating field is zero, there is no net differential phase shift produced and, hence, no light output.

It was stated previously that the length L is equal to the ratio $v_n/f$, where $v_n$ is the velocity of light in the electro-optical medium, and $f$ is the modulating frequency. There is, however, a second requirement placed upon the resonator length. It must be resonant at the modulating frequencies. This means that the resonator length must be equal to an integral number of half wavelengths at the modulating frequency. Both these requirements upon the resonator length can be satisfied simultaneously by adjusting the resonator diameter since, as is well known, the guided wavelength varies as a function of the cross-sectional dimensions of the waveguide. Knowing the velocity of propagation of light within the medium and the modulating frequency, the resonator length is fixed. The diameter is then varied until the length, as computed above, corresponds to an integral number of half wavelengths at the modulating frequency.

There is, however, an upper limit to the resonator diameter. To insure that higher order modes, such as the $TM_{022}$ or $TM_{032}$, cannot be induced, the resonator is preferably cut-off for these modes. This, however, presents no difficulty since there will always be some diameter, less than the maximum permissible diameter, for which the resonator will be resonant at the modulating frequency.

In the above discussion the operation of the modulator was discussed with resonator 15 excited in the $TM_{012}$ mode. It is apparent, however, that the resonator can alternatively be excited in the $TM_{011}$ mode, in the $TM_{013}$ mode or, more generally, in the $TM_{01p}$ mode. The operation for any of these modes is precisely as described above, the only difference being that the length L of the resonator is, more generally, given as $$L = \frac{p}{2} \frac{v_n}{f}$$

where $p$ is equal to the electrical length of the resonator expressed in half wavelengths. Thus, in the illustrative example discussed above, where $p=2$, the expression for L is simply $v_m/f$ as given.

In considering the operation of the modulator shown in FIG. 1, it was seen that in the absence of a modulating field, no light is transmitted through the system. On the other hand, in the presence of a modulating field some light is transimtted, with maximum light being transmitted when the differential phase shift is 180 degrees. However, a 180 degree differential phase shift can be produced with the modulating field directed parallel to the optical axis in either direction. Thus, referring to FIG. 4, a 180 degree phase shift can be produced in a wave introduced into the cavity at time A', which corresponds to maximum positive excitation, or at a time $E'$, which corresponds to maximum negative excitation. While the sense of rotation of the wave emerging from the cavity in the two cases is opposite, nevertheleses the wave leaving the resonator is linearly polarized and rotated 90 degrees. Thus, a system of this type produces frequency doubling. When used as a pulse modulator, this is a matter of little importance since the only fact of interest is the presence or absence of a light signal. When used for continuous wave modulation, however, in which it is important to preserve the frequency of the modulating wave, it is necessary to introduce a constant rotation into the light path between the polarizer and the analyzer. The constant rotation is in the nature of an optical bias which introduces a fixed 90 degree relative phase shift about which the phase shift introduced by the differential phase shifter 13 varies. In this latter arrangement phase shifter 13 is adjusted to produce a maximum relative phase shift of only 90 degrees. The total phase shift then varies between zero degrees (for no transmission) to 180 degrees (for maximum transmission) depending upon the polarity and amplitude of the modulating signal.

In the illustrative embodiment of the invention described above, the reflecting resonator ends 21 and 22 are shown as parallel, planar members. More efficient utilization of the electro-optical material can be obtained, however, if one or both of the ends are curved as shown in FIG. 5. Specifically in FIG. 5, the resonator 15 has one planar end 50 and one convex end 51. The purpose in curving end 51 is to cause the reflected rays to spend a greater portion of their time in the vicinity of the resonator axis $x-x'$ where the intensity of the modulating field is greatest (see FIG. 3). The effect upon the light trajectory is illustrated in FIG. 6 wherein the distance between a point in the wavefront and the axis is plotted versus time for parallel reflectors and for at least one curved reflector. For the case of planar reflectors the light trajectory, in terms of distance from the axis as a function of time, is a straight line. For the curved reflector case the trajectory is S-shaped and, as can be seen from this curve, the light ray is closer to the axis (and to the region of high field intensity) at all times. Thus, for a given number of reflections, a smaller resonator can be used to produce the same total relative phase shift.

The precise shaping of the curved end 51 is a matter of design and can be varied depending upon the particular problem at hand. Typically, end 51 can be a portion of a sphere whose center lies along the resonator axis and whose radius $r$ satisfies the inequality $$r > \frac{R}{\tan \theta} - L$$

where $L$ is the length of the resonator measured along the axis,
$R$ is the resonator radius, and
$\theta$ is the angle between the incident ray and the axis.

If the end 51 is other than a portion of a sphere, the radius of curvature $r$ at any particular point satisfies the inequality $$r > \frac{h}{\tan \theta}$$

where $h$ is the distance from the axis to the point, and
$\theta$ is the angle between a ray incident upon said point and the axis.

In the illustrative embodiment described above, a circular cylindrical microwave resonator energized in one of the $TM_{01p}$ modes was described. It is apparent, however, that the invention is not limited to this particular type resonator. Any resonator capable of being excited in a mode which has electric field components parallel to the optical axis of the electro-optical material can be used. Thus, the microwave resonator could alternatively be a rectangular resonator energized in one of the $TM_{11p}$ modes or the resonator could be a rectangular waveguide excited in a $TE_{10p}$ mode wherein the optical axis of the electro-optical material extends in a direction perpendicular to a pair of walls of the rectangular guide. In such an arrangement the optical wave is introduced into, and extracted from, said resonator through apertures in said pair of walls. These two alternative embodiments are illustrated in FIGS. 7 and 8.

Figure 7:
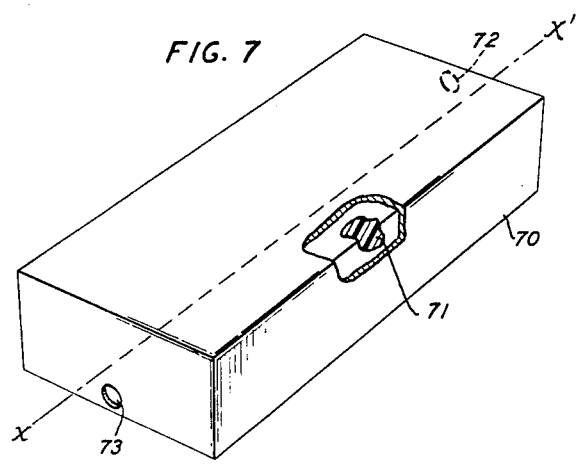
FIGS. 7 and 8 show alternate embodiments of the resonator structure.

In FIG. 7 the resonator, which is energized in a $TM_{11p}$ mode, comprises a section of rectangular waveguide 70 conductively terminated at both ends. The electro-optical material 71 is located within guide 70 with its optical axis aligned parallel to the longitudinal axis $x-x'$ of guide 70. The optical wave is introduced into the resonator at a slight angle to the optical axis as explained above. For purposes of illustration, the optical wave enters the resonator, in the embodiment of FIG. 7, through an aperture 72 at one end of the resonator and leaves through a second aperture 73 in the opposite end.

Figure 8:
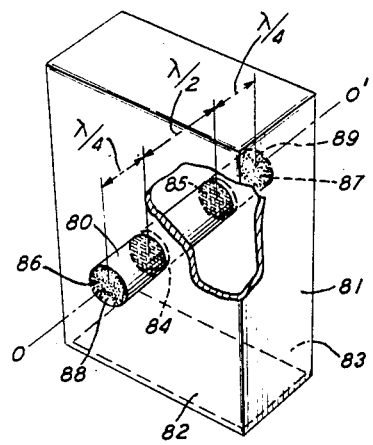

In the embodiment of FIG. 8 the arrangement is slightly different than heretofore in that the electro-optical material 80 extends beyond the resonator enclosure 81. The latter, as shown, is a conductively terminated section of rectangular waveguide. The electro-optical material 80 passes through apertures in the walls 82 and 83 of guide 81 in a direction perpendicular thereto and extends symmetrically beyond the guide on both sides. The total length of material 80 is, as before, given by $$L = v_m/f$$

The portion between the walls 82 and 83 within guide 81 is equal to $L/2$. The portion extending beyond the guide on each side is equal to $L/4$.

To confine the microwave fields within the enclosure 81 and still pass the optical wave, screen meshes 84 and 85 are embedded within the electro-optical material 80 where the material passes through the walls 82 and 83. To cause multiple reflections of the optical wave within the material 80, the ends 86 and 87 are silvered except for a small region 88 and 89 in each of the ends through which the optical wave is introduced into, and extracted from, the electro-optical material.

The resonator is energized in one of the $TE_{10p}$ modes such that the electric field vectors associated with the microwave energy extends in a direction perpendicular to the walls 82 and 83. In accordance with the invention, the optical axis of the material is similarly aligned in a direction perpendicular to said walls. In addition, for most efficient operation the optical material is located in a region of maximum electric field intensity.

The embodiment of FIG. 8 should be distinguished from the embodiment of FIG. 1. In FIG. 8 the section of restangular guide 81 is part of the microwave resonator. In the embodiment of FIG. 1, however, the rectangular guide 17 is merely associated with the means for exiting the microwave resonator 15.

In the embodiment of FIGS. 7 and 8 described above, the means for exciting the microwave resonator were not shown. It is understood, however, that any means will known in the art can be employed such as, for example, probes or loops suitably inserted within the confines of the resonator. In addition, the wave polarizer and analyzer associated with the modulator in accordance with the invention are not shown but it is understood that they would be included in the optical wave path in accordance with the description of FIG. 1.

Thus, in all cases, it is understood that the above-described arrangements are illustrative of but a small number of the many possible specific embodiments which can represent applications of the principles of the invention. Numerous and varied other arrangements can readily be devised in accordance with these principles by those skilled in the art without departing from the spirit and scope of the invention.

What is claimed is:

1. Apparatus for modulating an optical wave at a microwave frequency comprising in cascade:
   a wave polarizer;
   a differential phase shifter;
   and a wave analyzer;
   characterized in that said differential phase shifter is a microwave resonator comprising;
   a hollow, conductive cylinder having conductively terminated ends;
   said ends also being highly reflective for said optical wave;
   a rod of electro-optical material located within said cylinder with its optical axis aligned parallel to the cylinder axis;
   the dimensoins of said resonator being proportioned to support wave energy at said microwave frequency in a $TM_{01p}$ mode;
   said resonator being further proportioned to have a length L along the resonator axis given by $$L = \frac{p}{2} \cdot \frac{v_m}{f}$$

where:

$p$ is the length of the resonator along the axis expressed as the number of half periods of the microwave frequency,
   $v_m$ is the velocity of propagation of the optical wave in the electro-optical material, and
   $f$ is the microwave frequency;

means for exciting said resonator at said microwave frequency;
   means for introducing an optical wave into said resonator through one of said ends;
   and means for extracting said optical wave from said resonator through one of said ends.

2. The combination according to claim 1 wherein said resonator ends are parallel, planar surfaces.

3. The combination according to claim 1 wherein at least one of said resonator ends is a convex surface.

4. The combination according to claim 3 wherein said convex end is a portion of a sphere whose radius $r$ satisfies the inequality $$r > \frac{R}{\tan \theta} - L$$

where:

L is the length of the resonator measured along the resonator axis,
   R is the resonator radius, and
   $\theta$ is the angle the direction of propagation of the applied optical wave makes with the resonator axis.

5. The combination according to claim 3 wherein the radius of curvature $r$ varies over said convex surface and at any particular point satisfies the inequality $$r > \frac{h}{\tan \theta}$$

where:

$h$ is the distance from the resonator axis to said point, and
   $\theta$ is the angle between the direction of propagation of the optical wave incident upon said point and the resonator axis.

6. The combination according to claim 1 wherein the direction of polarization of said wave polarizer and the direction of polarization of said wave analyzer are perpendicular to each other.

7. Apparatus for modulating a light wave at a microwave frequency comprising means for projecting said light along a light path,
   a light polarizer along said path,
   an elongated rod of material exhibiting electro-optical effects whose optical axis extends parallel to the rod axis disposed along said path,
   said rod having an axial length equal to the velocity of light through said rod divided by said microwave frequency,
   means for short circuiting the ends of said rod for said microwave frequency and for reflecting said light wave,
   means for introducing said light into said rod at a small angle to said optical axis,
   means for exciting said rod in the $TM_{012}$ mode at said microwave frequency,
   means for extracting light from said rod,
   and a light analyzer in said path following said rod.

8. The combination according to claim 7 wherein said rod exhibits two mutually perpendicular principal directions and wherein the direction of polarization of said light applied to said rod is 45 degrees with respect to the principal directions of said rod.

9. The combination according to claim 8 wherein the direction of polarization of said wave polarizer and the direction of polarization of said wave analyzer are perpendicular to each other.

10. An optical wave differential phase shifter characterized in that said phase shifter is a microwave resonator comprising:
    a hollow, conductively bounded enclosure having conductively terminated ends;
    said ends being highly reflective for said optical wave;
    an element of electro-optical material located within said enclosure with its optical axis extending between said ends;
    means for energizing said resonator at a microwave frequency in a mode having electric field components extending in a direction parallel to said optical axis;
    said resonator proportioned to have a length L between ends given by $$L = \frac{p}{2} \cdot \frac{v_m}{f}$$

where:

$p$ is the length of the resonator between ends expressed as the number of half periods of the microwave frequency,
    $v_m$ is the velocity of propagation of the optical wave in the electro-optical material, and
    $f$ is the microwave frequency;

means for introducing an optical wave into said resonator at a slight angle to said optical axis; and
    means for extracting said optical wave from said resonator.

11. Apparatus for modulating an optical wave at a microwave frequency comprising in cascade:
    a wave polarizer;
    a differential phase shifter;
    and an analyzer;
    characterized in that said differential phase shifter is a microwave resonator comprising;
    a hollow conductivity bounded enclosure having conductively terminated ends;
    said ends being highly reflective for said optical wave;
    an element of electro-optical material located within said enclosure with its optical axis extending between said ends;
    the dimensions of said resonator being proportioned to support wave energy at said microwave frequency in a mode having electric field components extending in a direction parallel to said optical axis;
    said resonator being further proportioned to have a length L along said optical axis given by $$L = \frac{p}{2} \cdot \frac{v_m}{f}$$

where:

$p$ is the length of the resonator along the axis expressed as a number of half periods of microwave frequency, $v_m$ is the velocity of propagation of the optical wave in the electro-optical material, and $f$ is the microwave frequency;

means for introducing an optical wave into said resonator at an angle with respect to the optical axis;

and means for extracting said optical wave from said resonator.

12. The combination according to claim 11 wherein said enclosure is a section of rectangular waveguide and wherein said resonator is excited in one of the $TM_{11p}$ modes.

13. Apparatus for modulating an optical wave at a microwave frequency comprising in cascade:

a wave polarizer;

a differential phase shifter;

an analyzer;

characterized in that said differential phase shifter is a microwave resonator comprising;

a section of conductively bounded rectangular waveguide having a pair of narrow and a pair of wide walls;

said wide walls being reflective for said optical wave;

an element of electro-optical material located within said waveguide with its optical axis extending in a direction perpendicular to said wide walls;

the dimensions of said resonator being proportioned to support wave energy at said microwave frequency in one of the $TE_{10p}$ modes, where $p$ is an integer equal to the number of half periods of microwave energy supported in said resonator;

said resonator being further proportioned to have a length L between said wide walls given by $$L = v_m/f$$

where:

$v_m$ is the velocity of propagation of the optical wave in said optical material, and $f$ is the microwave frequency;

means for introducing an optical wave into said resonator at an angle with respect to the optical axis;

and means for extracting said optical wave from said resonator.

14. An optical wave differential phase shifter characterized in that said phase shifter is a microwave resonator comprising:

a section of conductively bounded rectangular waveguide having opposite pairs of parallel walls;

an element of electro-optical material passing through said section in a direction substantially perpendicular to one of said paths of walls and extending symmetrically beyond said section on both sides;

said material having its optical axis aligned in a direction perpendicular to said one pair of walls;

said material having a total length L given by $$L = v_m/f$$

where:

$v_m$ is the velocity of propagation of the optical wave in the electro-optical material, and $f$ is the microwave frequency, of which length a portion $L/2$ extends within said guide and a portion $L/4$ extends beyond said guide on each side thereof;

means for exciting said resonator in one of the $TE_{10p}$ modes where $p$ is an integer equal to the number of half periods of microwave energy supported in said resonator and wherein the electric field vectors associated with said mode extending in a direction substantially parallel to said optical axis;

means for introducing an optical wave into said material at a slight angle to said optical axis;

and means for extracting said optical wave from said material.

References Cited by the Examiner
UNITED STATES PATENTS

| | | | |
|---|---|---|---|
| 2,913,665 | 11/1959 | Bomke | 88—61 |
| 2,974,568 | 3/1961 | Dillon | 88—61 |

JEWELL H. PEDERSEN, *Primary Examiner.*

R. L. WIBERT, *Assistant Examiner.*